United States Patent [19]

Roberts et al.

[11] Patent Number: 5,314,741
[45] Date of Patent: May 24, 1994

[54] RUBBER ARTICLE HAVING PROTECTIVE COATING

[75] Inventors: Robert F. Roberts, Uniontown; Dane K. Parker, Massillon; James R. Purdon, Jr., Stow, all of Ohio

[73] Assignee: The Goodyear Tire & Rubber Company, Akron, Ohio

[21] Appl. No.: 957,121

[22] Filed: Oct. 7, 1992

[51] Int. Cl.$^5$ .................. B32B 27/08; B05D 3/02
[52] U.S. Cl. .................. 428/215; 428/519; 428/494; 428/521; 427/393.5
[58] Field of Search ............ 428/215, 519, 521, 494; 427/393.5

[56] References Cited

U.S. PATENT DOCUMENTS

| | | | |
|---|---|---|---|
| 4,384,081 | 5/1983 | Kubo et al. | 525/339 |
| 4,452,950 | 6/1984 | Wideman | 525/339 |
| 4,457,799 | 7/1984 | Dunn | 156/307.1 |
| 4,464,515 | 8/1984 | Rempel et al. | 525/338 |
| 4,469,849 | 9/1984 | Murrer et al. | 528/239 |
| 4,645,793 | 2/1987 | Von Hellens et al. | 524/518 |
| 4,806,351 | 2/1989 | Sugimoto et al. | 428/421 |
| 5,039,737 | 8/1991 | Parker et al. | 524/804 |

FOREIGN PATENT DOCUMENTS 1558491  1/1980  United Kingdom .

OTHER PUBLICATIONS

Kubo, Y. et al., "Adhesion between hydrogenated nitrile elastomers and fibers is improved using hydrogenated acrylonitrile-butadiene latex", Paper No. 29, presented at a meeting of the Rubber Division, American Chemical Society, Washington D.C., Oct. 9-12, 1990.

Marshall, A. J., "Interfacial adhesion of a elastomers to HNBR", Rubber World, May 1992, pp. 27-32 and 63.

*Primary Examiner*—P. C. Sluby
*Attorney, Agent, or Firm*—Bruce J. Hendricks

[57] ABSTRACT

A polymeric article which is subject to attack by oxygen ozone and/or ultraviolet light is coated with a thin coating of a polymer which is resistant to oxygen, ozone and UV light. It protects the article from cracking or degradation due to any of these causes. The uncoated article serves as a substrate. The substrate may be any polymer which is subject to attach by oxygen, ozone and/or ultraviolet light. A preferred coating is cured from a highly saturated polymer having only a small amount of unsaturation, as for example, hydrogenated nitrile rubber (HNBR, or hydrogenated nitrile/butadiene copolymer), highly saturated styrene/butadiene copolymer, hydrogenated polybutadiene, or hydrogenated styrene/vinylpyridine/butadiene terpolymer. The hydrogenated or highly saturated polymer of the coating is obtained by hydrogenating an unsaturated polymer which is a polymer of 1,3-butadiene (5-100% by weight) and optionally one or more monoethylenically unsaturated polymers (0-95% by weight). The cured coatings are typically elastomeric. The coating is applied as an uncured highly saturated polymer latex, which is dried and cured in place on the substrate to yield the desired coated article. The thickness of the coating may be about 0.5 mil (0.0005 inch) up to approximately 10 mils (0.01 inch).

20 Claims, 1 Drawing Sheet

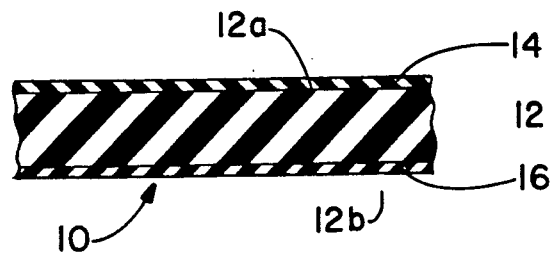
FIG.-1
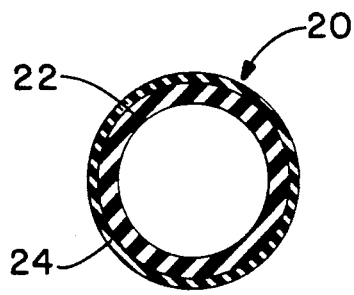
FIG.-2
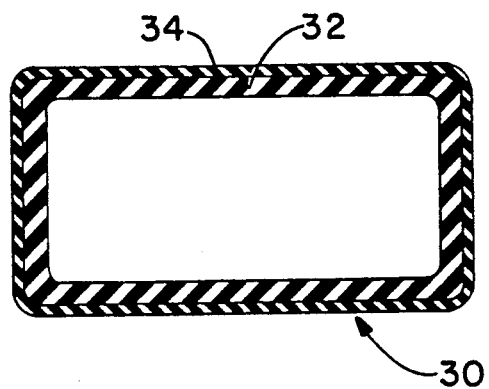
FIG.-3
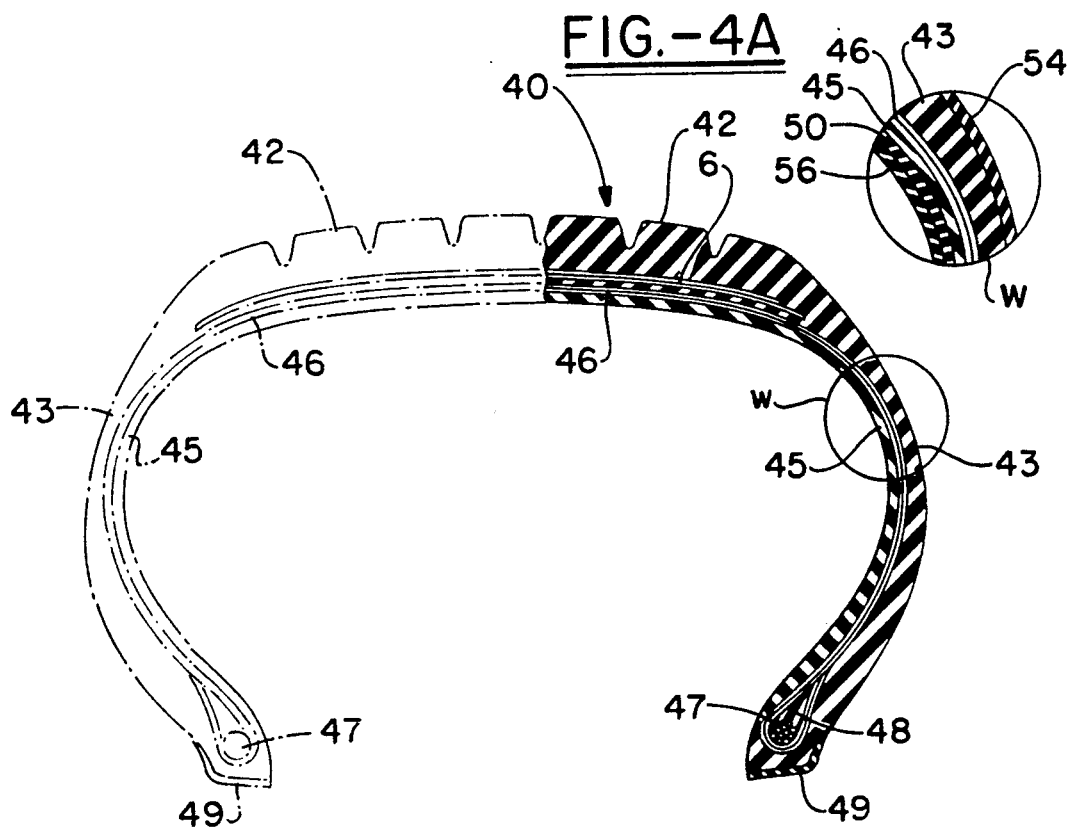
FIG.-4A
FIG.-4

RUBBER ARTICLE HAVING PROTECTIVE COATING

TECHNICAL FIELD

This invention relates to rubber and plastic articles, and more particularly the coated rubber or plastic articles in which the article is coated with a thin protective coating of a material which protects the article from an attack by oxygen, ozone and ultra-violet radiation.

BACKGROUND ART

Vulcanized or cured rubber articles made from most rubber-forming unsaturated polymers are known to be susceptible to attack by oxygen, ozone and ultra-violet radiation. Vulcanizates of natural rubber, synthetic polyisoprene, acrylonitrile-butadiene (nitrile-butadiene rubber, NBR) and styrene-butadiene (SBR), to name a few, are all susceptible to oxygen, ozone and ultra-violet attack. It is believed that this susceptibility is due to the presence of unsaturation in the rubber even after vulcanization. Some susceptibility exists in most conventional rubbers, even though antioxidants and antiozonants are routinely included in compounding recipes for making the vulcanizates.

Certain plastics and articles made therefrom are also known to be susceptible to ultra-violet (UV) light, and in some cases, also to oxygen and ozone. For example, polyethylene and styrene-maleic anhydride are known to be UV susceptible. (UV is a standard abbreviation for ultra-violet and will be used throughout the specification).

Polymers which are highly resistant to attack by oxygen, ozone and ultraviolet light are also known. One such class of polymers are those obtained by hydrogenating a conventional unsaturated polymer, e.g., a conjugated diene-containing polymer such as polyisoprene, styrene-butadiene copolymer (SBR) or a nitrile rubber (e.g., an acrylonitrile/butadiene copolymer, or NBR). U.S. Pat. No. 4,452,950 to Wideman discloses a hydrogenation process of this type, wherein an unsaturated polymer in latex form is hydrogenated with a combination of an oxidant (oxygen, air, hydrogen peroxide or a hydroperoxide), a reducing agent which is hydrazine or a hydrate thereof, and a metal ion activator. Much of the carbon-to-carbon unsaturation in the starting unsaturated polymer is reduced. Illustrative starting polymer latexes include nitrile rubber, (NBR), styrene/butadiene (SBR), polybutadiene (PBR) and styrene/vinylpyridine/butadiene terpolymer (vinylpyridine).

Other references disclosing hydrogenation of unsaturated conjugated diene-containing polymers are U.S. Pat. No. 4,384,081 to Kubo et al., U.S. Pat. No. 4,464,515 to Rempel et al., and British Patent No. 1,558,491.

DISCLOSURE OF THE INVENTION

An object of this invention is to provide a coated polymeric article wherein the polymer of the article is normally subject to attack by oxygen, ozone and/or UV light and wherein a thin protective coating of a polymer which is resistant to attack by oxygen, ozone and UV light, which coating protects the article from such attack.

Another object of this invention is to provide a coated polymeric article comprising a substrate or uncoated article of a polymer which is subject to attack by oxygen, ozone and/or UV light, and a protective coating of an oxygen, ozone, and UV radiation resistant polymer such that the substrate is protected from attack by oxygen, ozone or UV radiation while possessing essentially the same mechanical properties as those of the uncoated substrate.

This invention according to one aspect provides a composite comprising:
  (a) a polymeric substrate wherein said substrate has an exposed surface and the polymer of said substrate is a polymer which is subject to attack by oxygen, ozone and UV light or a curable precursor thereof; and
  (b) a protective elastomer coating of a curable highly saturated polymer or vulcanizate thereof which is adhered to said surface of said substrate, said protective coating protecting said substrate from attack by oxygen, ozone and UV light, wherein said curable highly saturated polymer is a curable hydrogenated polymer obtained by hydrogenating a latex of an unsaturated polymer of 1,3-butadiene and optionally one or more monoethylenically unsaturated comonomers, in which 1,3-butadiene constitutes from about 5 to 100 percent by weight and said one or more monoethylenically unsaturated polymers constitute from 0 to about 95 percent by weight of the unsaturated polymer, and wherein the curable highly saturated polymer contains no more than about 20 percent of the unsaturation of the unsaturated polymer.

The preferred composite is a coated article in which the substrate is the corresponding uncoated article, the exposed surface is an outside surface which is normally exposed to light and air.

This invention according to another aspect provides a process for preparing a composite and in particular a coated article comprising a polymeric substrate having an outside surface and a protective polymeric coating applied to the outside surface. This process comprises:
  (a) applying a curable polymeric coating in latex form to the outside surface of the substrate, wherein the polymer of the substrate is subject to attack by oxygen, ozone and/or UV light and wherein further the polymer of the coating is a highly saturated polymer as defined above and which is resistant to attack by oxygen, ozone and UV light; and
  (b) drying said coating.

Preferably the coated article is heated to an elevated temperature sufficient to heat bond the coating to the substrate. More preferably, the elevated temperature is sufficient to cause curing.

BRIEF DESCRIPTION OF THE DRAWINGS

In the drawings:

FIG. 1 is a diagrammatic cross-sectional view of a coated article according to this invention;

FIG. 2 is a diagrammatic cross sectional view of a hose in accordance with this invention;

FIG. 3 is a diagrammatic cross sectional view of a fuel tank in accordance with this invention; and FIG. 4 is a cross sectional view of a tire which has been coated in accordance with this invention.

FIG. 4A is a partial enlarged cross-sectional view of FIG. 4.

PRACTICE OF THE INVENTION

This invention will now be described in detail with reference to preferred embodiments thereof.

Throughout the specification, including the claims, all amounts are given in parts by weight unless specifically stated otherwise. Also, unless specifically stated otherwise, all polymer compositions are specified in parts by weight per 100 of rubber (or polymer) i.e., PHR.

FIG. 1 illustrates a composite, i.e., broadly a coated article or laminate in accordance with this invention. Referring to FIG. 1, 10 is a coated article comprising a polymeric substrate 12 having opposite first and second surfaces; a polymeric coating 14 according to this invention applied to the first surface and optionally a second polymeric coating 16, also according to this invention, applied to the second surface of substrate 12.

Substrate 12 may be a conventional article, made of a conventional polymer which is subject to attack and degradation by oxygen, ozone and UV light. In the preferred embodiments the polymer of substrate 12 is a cured rubber or elastomer obtained by curing an unsaturated polymer, typically a conjugated diene-containing polymer. The cured polymer is subject to attack by oxygen, ozone and/or UV light, probably due to the presence of some residual unsaturation. However, other polymers such as thermoplastic elastomers and certain polymers derived from monounsaturated monomers, as for example, polyethylene and styrene-maleic anhydride copolymer, are also subject to attack by oxygen, ozone and/or UV light, again probably because of the presence of small residual amounts of unsaturation, and these also can be substrates in accordance with this invention.

The polymer of coating 14 is an elastomer which is resistant to attack by oxygen, ozone and UV light. Preferably the polymer of coating 14 is a cured rubber or elastomer obtained on curing a highly saturated polymer, which in turn is obtained by hydrogenating an unsaturated polymer, which is typically a polymer of one or more monomers including 1,3-butadiene. Resistance to oxygen, ozone and UV light is attributable to the low degree of residual unsaturation and in some cases the absence or virtual absence of residual unsaturation. The polymer of coating 14 is preferably a cured elastomer which is obtained by curing a highly saturated film forming polymer, i.e., one in which most (e.g., at least 80% and typically 90% or more) of the unsaturation has been removed by reducing an unsaturated polymer (typically a polymer of one or more monomers including 1,3-butadiene) prior to curing. The cured polymer of coating 14 contains little or no residual unsaturation and is therefore resistant to attack by oxygen, ozone or UV light.

In some cases the coating 14 of the coated article 10 in finished form may be an uncured elastomer. An uncured coating is suitable when neither good flex resistance nor high abrasion resistance is required For example, an automobile dashboard crash pad may be made according to this invention, utilizing either a cured or uncured elastomeric coating 14.

The coating 14 as applied to the substrate 12 is an uncured highly saturated film forming polymer. For most purposes this polymer is cured after application to the substrate. For some purposes, as noted above, the polymer of coating in the end product may be uncured.

Coating 16 when present is applied to a second surface of substrate 12. Coating 16 when present may be and generally is identical in composition to coating 14.

Coating 16 is necessary or at least desirable to protect the substrate 12 when the substrate 12 has two opposite surfaces which are exposed to light and air. In a number of cases, however, the article 10 is a container, hose or other article in which the first surface is an outside surface, but the second surface is an inside surface which is normally protected from light and air. In that case the second coating 16 is unnecessary.

Coating 14 (and 16 When required) is useful for protecting any substrate surface which is normally exposed to air when in service, whether or not such surface is also normally exposed to light. For example, a pneumatic tire has an outside surface which is exposed to both light and air, and an inside surface which exposed to high pressure air but not to light.

Coating 14 is a continuous coating in film form which completely covers the first surface of substrate 12. Coating 14 is thick enough to completely cover the first surface of substrate 12, but not so thick as to alter materially the mechanical properties (such as ability to flex) of the substrate. Coating 16, when present, is also a continuous coating which covers the entire surface of substrate 12 to which it is applied.

The thickness of coating 14 (and 16 when present) may range from less than 1 mil to about 10 mils or more. The lower limit is determined by the minimum thickness required to completely cover the surfaces of substrate, and is typically about 0.5 mil (0.0005 inch). The maximum thickness is greatest thickness which will adhere to the substrate through all of the flexing to which the substrate is normally subjected, and which does not significantly affect the mechanical properties of the substrate. This maximum thickness may vary but is typically approximately 10 mils (0.01 inch). One mil is 0.001 inch (about 0.04 millimeter).

In a particularly preferred embodiment of this invention, the rubber of both the substrate 12 and the coating 14 (and coating 16 when present) are nitrile rubbers. The nitrile rubber of the substrate may be a vulcanizate of a conventional unsaturated nitrile rubber which is prone to attack and degradation by oxygen, zone and UV light. The coating rubber on the other hand is a cured modified nitrile rubber, i.e., a cured highly saturated nitrile rubber which is oxygen, ozone and UV resistant. The highly saturated rubber in its uncured form (e.g., HNBR) may be obtained by hydrogenating a conventional unsaturated nitrile rubber (e.g., NBR). Nitrile rubber is known for its high resistance to fuels, oils and solvents. Therefore articles in which both the coating rubber and the substrate rubber are nitrile rubbers will have high fuel, oil and solvent resistant in addition to resistance to attack from ozone, oxygen and UV light. Such articles are particularly suitable as fuel hoses, fuel tank liners, gaskets, heels, shoe soles, printing rolls, grommets, and other purposes for which nitrile rubbers are typically selected.

FIG. 2 illustrates a nitrile rubber hose 20 in accordance with this invention. Hose 20 comprises a substrate 22 having an outside surface to which a highly saturated nitrile rubber 24 is applied. Since the inside surface of the substrate 22 will normally be protected by a fluid (say a hydrocarbon fuel) running through the hose, it is not necessary to coat this surface.

FIG. 3 illustrates diagrammatically a fuel tank 30 in accordance with this invention. The fuel tank 30 comprises a substrate 32 which may be of a conventional nitrile rubber, i.e., one which is prone to attack by oxygen, ozone and UV light. Laminated to an exposed surface of this substrate is a coating 34, which may be of a highly saturated nitrile rubber which resists attack by oxygen, ozone and UV light. This coating may be applied to the outside surface of substrate 32. Fuel in the tank 30 will normally protect the inside surface of substrate 32. Nitrile rubbers are also used as fuel tank liners, which may have only one exposed surface, the other being laminated to a material forming the tank itself. The exposed surface may be coated with a coating 14 according to this invention.

FIGS. 4 and 4A illustrate a tire in which an outside surface and optionally also an inside surface are coated with a protective coating in accordance with this invention. Except for the coating or coatings, shown in the "window" W in FIG. 4A, which is a detailed enlargement of FIG. 4, the structure of the tire may be conventional. Tire 40 comprises a tread 42, a pair of side walls 43 which abut the tread 42 in the shoulder regions 44, a fabric-reinforced rubber carcass 45 of generally toroidal shape and comprising one or more plies for supporting the tread and side walls, and a circumferential fabric-reinforced belt 46 of one or more plies, positioned between the carcass 45 and the tread 42.

Tire 40 also includes a pair of spaced circumferentially extending bundled wire beads 47 which are substantially inextensible. The carcass 45 extends from one bead 47 to the other and the side edges may be wrapped around the beads as shown. Tire 40 may also include a pair of stiff apex components 48 of triangular cross section in the region of the beads, and a pair of stiff chafer components 49 which are positioned in the bead region.

The components of the tire recited so far may be conventional. Also, the tire 40 as illustrated in FIG. 4 has been simplified in the interest of clarity by omitting parts which are not required for an understanding of this invention.

Referring now to FIG. 4A, tire 40 may also include an inner liner 50, which may be applied to the inside surface of the tire for improving air impermeability. Such inner liner is conventional.

Also as shown in FIG. 4A, tire 40 includes a protective coating 54 of a highly saturated rubber, as for example a highly saturated polybutadiene, styrene-butadiene rubber (SBR), or the like. The rubber of side walls 43 may be any conventional rubber used to make tire side walls, as for example unsaturated polyisoprene, polybutadiene, or SBR rubber. For greater affinity and adhesion, the rubber of protective coating 54 is preferably the highly saturated counterpart of the rubber of side walls 43. That is, for example, when the side wall rubber is SBR, the rubber of coating 54 will be highly saturated SBR.

A coating 56 of a highly saturated rubber on the inside surface of a tire is optional. The inside surface of a tire will normally be subject to attack by oxygen and ozone, but not to ultraviolet light.

Coating 56 when present may be applied to the exposed surface of inner liner 50, or when no inner liner is present, to the exposed surface of carcass ply 45. The rubber of coating 56 when present is preferably the highly saturated or hydrogenated counterpart of the rubber of inner liner 50 or the rubber of carcass 45, as the case may be. The inner liner rubber and the carcass rubber may be conventional.

The highly saturated polymer of protective coating 14 (or 16) may be formed by hydrogenating a conventional unsaturated 1,3-butadiene-containing polymer and then curing (or vulcanizing) the resulting uncured polymer having substantially reduced unsaturation.

The starting unsaturated polymer for preparing the coating polymer is one which is prepared from 5 to 100 percent by weight of conjugated diene monomer units and 95 to 0 percent by weight of ethylenically unsaturated monomer units. The conjugated diene monomer units are derived from 1,3-butadiene monomer, and the ethylenically unsaturated monomer units are derived from one or more ethylenically unsaturated monomers. Specific examples of the ethylenically unsaturated monomer include unsaturated nitriles such as acrylonitrile and methacrylonitrile, monovinyl aromatic hydrocarbons such as styrene and alkylstyrenes, divinyl aromatic hydrocarbons such as divinyl benzene, dialkenyl aromatics such as diisopropenyl benzene, unsaturated carboxylic acids and esters thereof such as acrylic acid, methacrylic acid, crotonic acid, itaconic acid, maleic acid, methyl acrylate, methyl methacrylate, ethyl acrylate, butyl acrylate, 2-ethylhexyl acrylate or methacrylate, vinylpyridine, and vinyl esters such as vinyl acetate.

The conjugated diene polymer (or unsaturated polymer) may be prepared by known polymerization techniques, say for example emulsion polymerization, solution polymerization or bulk polymerization. Emulsion polymerization is highly preferred. Specific examples of the conjugated diene polymer include polybutadiene, a styrene/butadiene (random or block) copolymer, an acrylonitrile/butadiene (random or block) copolymer, and a butadiene/isoprene copolymer.

Reduction or hydrogenation of the unsaturated polymer is preferably carried out according to the process described in U.S. Pat. No. 4,452,950 to Wideman cited supra. As described therein, it is highly preferred that the unsaturated polymer be prepared in an aqueous emulsion polymerization and be reduced in the latex form without prior coagulation or use of organic solvents. In other words, the uncured hydrogenated (or highly saturated) rubber latex is prepared directly from an uncured unsaturated polymer latex. The unsaturated polymer latex is contacted with a reducing or hydrogenating agent which is a combination of an oxidant selected from the group consisting of oxygen, air, hydrogen peroxide and hydroperoxides, and a reducing agent selected from the group consisting of hydrazine and hydrates thereof. Hydrogen peroxide is the preferred oxidant for purposes of the present invention. Such hydrogenation is carried out in the presence of a metal ion initiator, such as copper sulfate. Reactant and initiator utilization is enhanced and yield of hydrogenated product improved by adding a small amount of an alkylated diphenyl ether disodium salt of a disulfonic acid, which is an ionic surfactant.

For the purposes of the present invention, the starting uncured highly saturated rubber latex is prepared by hydrogenating a latex (or aqueous emulsion) of an unsaturated rubber as above described with about 1.3 to about 1.4 times the theoretical quantity of hydrazine (or a hydrazine hydrate) necessary to reduce the double bonds present, and a quantity of hydrogen peroxide which is equivalent to or slightly in excess of the quantity of hydrazine charged. Such quantity of hydrogen peroxide is sufficient to react with the excess hydrazine so that only a trace remains. The remaining trace amounts of hydrazine can be further reduced by the process of U.S. Pat. No. 5,039,737 to Parker et al.

Hydrogenated or highly saturated rubbers used as coating polymers herein should have a saturation level of at least 80%; typically they will have a saturation level of about 90% to about 99%. Preferably the hydrogenated rubber has a saturation level of about 92 to 98%. (The saturation level denotes the percentage of double bonds of the starting polymer that are hydrogenated). A small amount of residual unsaturation in the highly saturated polymer is essential for sulfur curability. On the other hand, the percentage of residual unsaturation must not be so large that the desired resistance to oxygen ozone and ultraviolet light and the cured highly saturated polymer is not achieved.

It will be understood that the hydrogenated uncured polymer, or "highly saturated polymer" in uncured form, can be formed by other means known in the art, as for example, the hydrogenation methods illustrated in U.S. Pat. Nos. 4,384,081 to Kubo et al, U.S. Pat. No. 4,464,515 to Rempel et al, and British Patent No. 1,558,491.

A particularly preferred hydrogenated polymer, or highly saturated polymer for practice, of this invention, is hydrogenated acrylonitrile/butadiene rubber (HNBR), which is been prepared by reducing or hydrogenating a nitrile-butadiene rubber (NBR) latex as described in U.S. Pat. No. 4,452,950. Other highly saturated or hydrogenated polymers for practice of this invention include hydrogenated styrene/butadiene rubber (HSBR), hydrogenated polybutadiene, and hydrogenated styrene/vinylpyridine/1,3-butadiene terpolymer.

Uncured HNBR is typically crosslinked to some extent. Some crosslinking takes place during reduction of NBR. This crosslinking is an aid in imparting film characteristics to HNBR. However, HSBR is also film forming even though it is not crosslinked.

The highly saturated polymer in latex form can be compounded and cured using compounding ingredients and curatives which are known in the art. Suitable curatives include known sulfur cure packages, which typically contain zinc oxide, sulfur (or sulfur compound) and accelerators. Peroxide cure systems can also be used. Other compounding ingredients include pigments, fillers (e.g., carbon black or silica), antioxidants and wetting agents. Curatives must be added as aqueous dispersions to the uncured highly saturated polymer latex emulsion.

The polymer of the substrate is preferably a rubber, i.e., a cured (or vulcanized) unsaturated polymer which contains carbon to carbon unsaturation. This unsaturated polymer may contain from 5 to 100% weight of conjugated diene monomer units and conversely 95 to 0% by weight of ethylenically unsaturated monomer units. The preferred unsaturated polymer contains carbon to carbon unsaturation to enable it to be sulfur cured. Representative unsaturated polymers include natural rubber (cis-1,4-polyisoprene) synthetic cis-1,4-polyisoprene, polybutadiene, styrene/butadiene copolymers, styrene/isoprene/butadiene terpolymers, styrene/vinylpyridine/butadiene terpolymers, butadiene/acrylonitrile copolymers, and isoprene/acrylonitrile copolymers.

A preferred substrate rubber is nitrile rubber, also known as NBR, which is an acrylonitrile/butadiene copolymer.

The substrate rubber can be compounded and cured according to recipes and methods known in the art. The rubber may be either sulfur cured or peroxide cured. In addition to a sulfur curative or a peroxide curative, the substrate rubber can be compounded with conventional compounding ingredients such as carbon black, silica, accelerator(s), antidegradants, zinc oxide, stearic acid, zinc stearate, and processing oils. These additives can be used in conventional amounts. Other additives not listed can also be used, and additives listed here can be omitted where appropriate. Use of relatively small amounts of "soap" (e.g., stearic acid and metal stearates) is helpful in promoting adhesion between coating and substrate.

Preferred combinations according to this invention are those in which the coating polymer is the hydrogenated analog of the substrate polymer. An especially preferred combination is hydrogenated nitrile rubber (HNBR), which is hydrogenated acrylonitrile/butadiene copolymer, as the coating polymer, and nitrile rubber (NBR), which is acrylonitrile/butadiene copolymer, as the substrate polymer.

The preferred substrate polymers and the preferred coating polymers are both elastomeric. Both are preferably cured polymers. The preferred substrate polymers are rubbers. Both the preferred substrate and coating polymers are characterized by an elongation at break of at least about 200% and a 200% modulus (i.e., a tensile modulus at 200% elongation) of at least about 200 pounds per square inch. Also, both polymers return essentially to their original dimensions after elongation. It is preferred that the modulus of the coating polymer and the modulus of the substrate polymer be similar in order to promote good adhesion.

The coating is applied in liquid form, i.e as a latex comprising the desired highly saturated polymer and desired compounding ingredients, e.g., curatives, (either sulfur or peroxide), accelerators, pigments, fillers, antioxidants and wetting agents (listed in greater detail above and in the examples which follow), dispersed either as an emulsion or a suspension in a liquid medium. Water is the primary liquid ingredient of the liquid medium, although one or more water miscible organic liquids such as butyl "Cellosolve" (ethylene glycol monobutyl ether) or "Cellosolve" (ethylene glycol monoethylether) may also be present. Solvents such as butyl Cellosolve promote more extensive polymer interpenetration across an interface, resulting in improved adhesion of the coating layer to the base layer. Such solvent may be added to the emulsion after addition of the compounding ingredients and before application of the coating of the compounding ingredients and before application of the coating substrate. The polymer as applied may be a curable polymer in its uncured form.

The substrate may be either cured or uncured at the time the coating polymer latex is applied. In general, better adhesion is obtained if the coating polymer latex is applied to an uncured substrate polymer after which the substrate and coating polymers can be co-cured under conventional curing conditions. When an end product having an uncured coating 14 is desired, the substrate must be cured before the coating polymer is applied, except when a substrate not requiring curing is used.

Some surface preparation of a substrate may be necessary before applying the coating, particularly if the substrate has been cured before the coating is applied. Adhesion between nitrile coatings and nitrile rubber substrates can be enhanced by first washing the substrate with isopropyl alcohol or with soapy water followed by a clear water rinse.

The surface of the substrate to be coated may be treated in either of the two ways (or in both ways), as illustrated above, in order to improve adhesion of the coating to the substrate. One way is to incorporate a water miscible organic solvent (e.g., butyl Cellosolve) which promotes polymer interpenetration across the substrate/coating interface. The other is to treat the substrate surface with a suitable liquid surface treating agent (e.g, isopropanol or soapy water) before the coating is applied. Both methods may be used in the preparation of the same coated article when desired.

The coating of the highly saturated latex may be applied by any well known technique such as knife coating, dipping, brushing and spraying as it would be appropriate to the shape of the rubber article or other substrate. The coating may then be dried by any convenient means such as a forced air oven, at conventional drying temperatures (e.g., about 80° C. to 100° C. or 176° C.-212° F.) for a time sufficient to evaporate the water present. The dried coating is generally in the form of a continuous film which covers the entire surface of substrate 12 which has been coated. The dried coating is then simultaneously cured and heat bonded to the article by subjecting the coated article to elevated temperature sufficient to cause curing.

The elevated temperature and time must be sufficient to effect curing of the coating. Curing temperatures will vary from one coating polymer composition to another, and will generally be in the range of about 100° C. to about 200° C. (212°-392° F.). Curing times will also vary from one polymer composition to another. In the case of the preferred HNBR, curing at 325° F. (163° C.) for ten (10) minutes has been found to be satisfactory. Heat bonding of the coating to the substrate takes place simultaneously with curing of the coating. Curing and heat bonding can take place at atmospheric pressure. No elevated pressure or additional molding are required although in general elevated pressure is not detrimental. Co-curing of the substrate 12 and the coating 14 will take place when the substrate is uncured at the time of application of the substrate to the coating. For example, when the substrate is a tire, the coating composition can be applied in latex form to the desired part or component of a green tire, as for example the side walls, and then the coated tire can be shaped and cured in a conventional tire mold. This results in curing of both the conventional tire components and the protective coating of this invention thereon. For the manufacture of other articles coated in accordance with this invention, other known techniques suitable for both shaping and curing a composite laminate can be used.

The terms "cured" and "vulcanized" are used interchangeably herein. A cured product may therefore be referred to as a vulcanizate in accordance with art recognized usage.

The present invention will be described in more detail in the following examples. These examples are merely for the purpose of illustration and are not to be regarded as limiting the scope of the invention or the manner in which it can be practiced. Unless specifically indicated otherwise, all parts and percentages are given by weight.

HYDROGENATION OF NBR

A nitrile rubber latex is hydrogenated by utilizing the general process of U.S. Pat. No. 4,452,950 to a saturation level of approximately 95-98%.

Hydrogenation is based on the following recipe: A 179.0 gram quantity of NBR latex containing 0.442 moles of double bonds, 3 drops of Dow Corning "Antifoam 1430" and an aqueous solution of copper sulfate pentahydrate and "Poly-tergent 2EP" (a sodium dodecyldiphenylether disulfonate surfactant) from Olin Corporation in an amount sufficient to provide 0.0077 grams copper sulfate and 0.15 grams of surfactant were added to a 250 cc four-neck flask equipped with a mechanical stirrer, thermometer, reflux condenser and an inlet tube for feeding hydrogen peroxide. A 23.5 ml charge of 64.4% aqueous hydrazine (0.487 moles, 110% of theory based on the moles of double bonds present) is then added to the stirred mixture before warming to 45°-50° C. At this temperature, 35.3 ml of 49.8% hydrogen peroxide is fed to the mixture. The reaction mixture is then allowed to stand at room temperature overnight before analysis NMR and FTIR (Fourier transform infra red) spectral analysis indicate that 93% of the double bonds have been reduced by the procedure forming HNBR.

The above hydrogenation procedure is a representative procedure for preparing hydrogenated acrylonitrile-butadiene rubber (HNBR) latex which is a preferred starting material for preparing coatings according to this invention. Variations can be made; for example, the amount of hydrazine can be about 130% to 140% of theory instead of the 110% of theory illustrated above. Some increase in yield of hydrogenated rubber is achieved by increasing the amount of hydrazine (or hydrazine hydrate) from 100% of theory up to about 130%-140% of theory. Further increases in the amount of hydrazine appear not to result in any further increase in yield of hydrogenated rubber. The yield of hydrogenated rubber (i.e., the saturation level of the product) is generally from about 92% to 98% in the above procedure (including minor variations such as the indicated variation in the amount of hydrazine).

Other unsaturated rubber latexes, such as styrene-butadiene rubber (SBR), styrene/vinylpyridine/butadiene terpolymer and polybutadiene, can also be hydrogenated as above described to form suitable coating rubber starting materials.

The following examples illustrate preparation of laminates and coated articles in accordance with this invention.

EXAMPLE I

A. Materials

Substrate. Two different types of nitrile rubber tensile sheets were used as substrate in the test series. Sheets of one type were sulfur cured and sheets of the other were peroxide cured.

A representative coating composition (or formulation) is given in Table I below.

TABLE I

| Ingredient | Coating Composition Parts by Weight |
|---|---|
| HNBR (1) | 100.00 |
| Zinc Oxide | 4.00 |
| Sulfur | 1.75 |
| ZMBT (2) | 2.00 |
| Zinc dibutyl dithiocarbamate | 0.75 |
| Surfactant (3) | 0.1 |
| Butyl "Cellosolve" | 55.00 |
| Water | To desired final solids |
| Total (exclusive of water) | 163.60 |

Note:
(1) Hydrogenated (highly saturated) nitrile/butadiene rubber.
(2) Zinc 2-mercaptobenzothiazole (an accelerator).
(3) FC-129, a fluorine-containing surfactant made by 3M Company.

HNBR may be obtained by reducing NBR according to the hydrogenation process described above (which is based on the process of U.S. Pat. No. 4,452,950).

The coating composition of Table I was prepared by adding aqueous dispersions of all solid compounding ingredients (i.e., all compounding ingredients except butyl "Cellosolve") and then adding butyl "Cellosolve" (ethylene glycol monobutyl ether), to an HNBR latex.

B. Process

The cured nitrile rubber substrate sheets were washed with isopropyl alcohol or with soapy water followed by a clear water rinse, prior to applying the coating composition. Isopropyl alcohol is preferred.

The coating composition of Table I, which is a latex emulsion, was applied to the surfaces of the nitrile rubber substrate sheets. The coating thickness was 4 mils wet, which gives approximately 1.25 mils dry thickness.

The coatings were dried in an oven for ten (10) minutes at 180° F. and then cured in another oven for ten (10) minutes at 325° F. This gave as the product coated nitrile rubber tensile sheets having thereon coatings, approximately 1.25 mils thick, of a cured HNBR polymer.

C. Testing

Bonding. Coated tensile test sheets, having cured coatings thereon and prepared as described in Part B of this example, were tested for coating adhesion by scraping with a knife. Some of the test sheets had sulfur cured nitrile rubber substrates, others had peroxide cured nitrile rubber substrates. The sulfur cured and peroxide cured test sheets showed good adhesion of a coating as cured (i.e., after curing with no further treatment) to the substrate.

The coating tensile sheets were then submerged in test fluids for up to 24 hours. The resistance to de-bonding and coating integrity were then evaluated. The fluids were methylethylketone (MEK), methyl teriary butylether (MBTE), demineralized water, and 50/50 mixture of water/ethanol.

Immersion times and effects on the integrity of the coatings and their adhesion to the nitrile rubber substrate are given in Table II below.

TABLE II

| | |
|---|---|
| MEK @ 5 hours | Coatings could be scraped off with knife (MEK = methyl ethyl ketone) |
| MTBE @ 3 hours | Coatings could be scraped off with knife. (MTBE = methyl tert-butyl ether) |
| Water @ 4 hours | Coatings had begun to cloud and could be scraped off with knife |
| 50/50 @ 6 + ½ hours | On the sulfur cured nitrile the coating maintained visual bonding and could be flexed without debonding. Coating on peroxide cured nitrile appeared slightly cloudy |
| All at 24 hours | Coatings integrity and bonding are similar to the above except that now they are worse on the peroxide cured nitrile than on the sulfur cured nitrile in each fluid |

Ozone resistance. A partially coated cured nitrile tensile pad, having a conventional nitrile rubber substrate as described in Part A of this example and partially coated with a coating having the composition shown in Table I and applied as described in Part C of this example, was formed as a bent loop and placed in an ozone chamber having an ozone concentration of 50 parts per hundred million (PPHM) at 104° F. (50° C.) for 24 hours. The coated portion of the test specimen demonstrated resistance to cracking, while severe ozone cracking was evident in the immediately adjacent uncoated nitrile rubber portion of the test specimen.

Coating film physical properties. Unsupported films of cured HNBR, having compositions similar to that of the coating composition shown in Table I, were prepared, using various cure times and temperatures as shown in Table III below. Also prepared for comparison purposes were unsupported films which are air dried but not cured. Drying temperatures and times are indicated in the column headed "Cure Time/° F." below. All films were tensile tested in order to determine modulus at 200% (200% modulus) tensile strength (ultimate strength) and percentage elongation at break. Results are shown in Table III.

TABLE III

FILM PHYSICAL PROPERTIES

| Film | Cure Time/°F. (°C.) | Modulus @ 200%, psi (MPa) | Tensile, psi (MPa) | Elongation % |
|---|---|---|---|---|
| HNBR air dried | 15/250 (121) | 162 (1.12) | 257 (1.77) | 275 |
| HNBR air dried | 10/350 (177) | 200 (1.38) | 375 (2.58) | 300 |
| HNBR + sulfur cure | 7/325 (165) | 328 (2.26) | 708 (4.88) | 290 |
| HNBR + sulfur cure | 5/350 (177) | 333 (2.29) | 803 (5.53) | 290 |

As the data in Table III show, cure times were shorter, and both 200% modulus and tensile strength were higher, in sulfur cured films than in uncured air dried films. In fact, the tensile strength at break was considerably higher in sulfur cured films than in uncured films.

Data in Table III show that both sulfur cured coating films and uncured coating films had high elongation and satisfactory 200% modulus, indicating that these films are elastomeric.

EXAMPLE II

A hydrogenated acrylonitrile-butadiene rubber (HNBR) latex was applied to one side only of uncured acrylonitrile-butadiene rubber (NBR) sheets. Some of these sheets contained a sulfur cure package; others contained a peroxide cure package. The composition of the HNBR latex is given in Table IV below:

TABLE IV

| Ingredient | phr |
|---|---|
| HNBR | 100.00 |
| Zinc Oxide | 4.0 |
| Sulfur | 1.75 |
| "B. Zimate" (1) | 0.75 |
| "Zetax" (2) | 2.00 |

Notes:
(1) Zinc dibutyldithiocarbamate (accelerator)
(2) Zinc 2-mercaptobenzothiazole The coated sheets were air dried in an oven at 180° F.

The coated air dried sheets were press cured in an oven between 9"×9" (22.9 cm×22.9 cm) stainless steel plates for thirty (30) minutes at 325° F. (165° C.) under pressure of 2.5 kg (5.5 pounds). (0.31 lbs/in²).

Sample sheet size is five (5) inches×3½ inches 12.7 cm×8.9 cm). Cured sheets prepared as described in this example were found to have excellent adhesion. The coated samples had poor surface smoothness, which is believed to be due to the low curing pressure used.

COMPARATIVE EXAMPLE A

A preformed HNBR film having the composition shown in Table IV was prepared by applying the latex to a surface of a non adhering substrate (i.e., a smooth metal plate). The so-coated substrates were air dried in an oven at 180° F. (82° C.).

A 5 inch×5 inch (12.7 cm×12.7 cm) sheet of dry HNBR film, prepared as described above, was laid up on a five (5) inch×5 inch sheet of uncured NBR containing a sulfur cure package. The thus formed air dried laminate with an aluminum foil tab on one edge was pressed cured between stainless steel plates to which a mold release compound was first applied. Curing took place for thirty (30) minutes at 325° F. (165° C.) under 5 tons of pressure.

Adhesion tests showed that adhesion between the coating layer and the substrate was poor.

While this invention has been described in detail with respect to preferred embodiments including the best mode and preferred embodiment, it shall be understood that such description is by way of illustration and not by way of limitation.

What is claimed is:

1. A composite laminate comprising:
   (a) a polymer substrate having an exposed surface wherein the polymer of the substrate is a conjugated diene-containing polymer or a polymer derived from a monounsaturated monomer or a mixture of monounsaturated monomers, and wherein said polymer contains residual unsaturation and is subject to attack by oxygen, ozone and ultraviolet light; and
   (b) a protective elastomer coating of a highly saturated polymer which is adhered to said surface of said substrate and completely covers said surface, wherein the highly saturated polymer of the coating is elastomeric and is a curable hydrogenated polymer obtained by hydrogenating a latex of an unsaturated polymer of about 5 of 100% by weight of 1,3-butadiene and 0 to about 95% by weight of one or more ethylenically unsaturated comonomers, and wherein said hydrogenated polymer contains not more than about 20% of the unsaturation of said unsaturated polymer, or a vulcanizate of said curable hydrogenated polymer, said protective coating protecting the substrate from attack by oxygen, ozone and ultraviolet light.

2. A composite laminate according to claim 1 wherein the polymer of said substrate is a rubber.

3. A composite laminate according to claim 2 wherein the rubber of said substrate is a cured rubber.

4. A composite laminate according to claim 2 wherein the rubber of said substrate is nitrile rubber and the rubber of the coating is a hydrogenated nitrile rubber.

5. A composite laminate according to claim 2, wherein the rubber of said substrate is a nitrile rubber.

6. A composite laminate according to claim 1 wherein said coating is adhered directly to said substrate.

7. A composite laminate according to claim 1 wherein said substrate and said coating are each elastomeric and each has an elongation at break of at least about 200%.

8. A composite laminate according to claim 1 wherein said substrate is three-dimensional and has a thickness dimension which is substantially less than either of the other two dimensions.

9. A composite laminate according to claim 1, wherein the polymer of said substrate is a vulcanizate of an unsaturated diene-containing polymer.

10. A composite laminate according to claim 9, wherein the polymer of said coating is a cured polymer obtained on curing a highly saturated rubber.

11. A composite laminate according to claim 10, wherein said highly saturated rubber is obtained by hydrogenating an unsaturated polymer of one or more monomers including 1,3-butadiene.

12. A composite laminate according to claim 11, wherein said coating is a hydrogenated styrene-butadiene rubber.

13. A composite according to claim 11, wherein said coating is a hydrogenated nitrile rubber.

14. A composite laminate according to claim 1 wherein coating is a continuous coating which covers the entire surface to which it is applied.

15. A composite laminate according to claim 14, wherein the thickness of said coating is sufficient to cover entire outside surface of the substrate but not over about 10 mils.

16. A composite laminate according to claim 15, wherein the thickness of the coating is from about 0.5 to about 10 mils.

17. A composite laminate according to claim 1, wherein the polymer of said coating is applied to a surface of said substrate as an uncured hydrogenated rubber latex and is dried and cured on said surface.

18. A composite laminate according to claim 17, wherein said uncured hydrogenated rubber latex is prepared directly from an uncured unsaturated polymer latex.

19. A composite laminate according to claim 17, wherein the substrate is cured prior to application of the coating rubber latex thereto.

20. A composite laminate according to claim 17, wherein the coating rubber latex is applied to an uncured rubber substrate and the polymer of said substrate and the polymer of said coating are co-cured.

* * * * *